United States Patent [19]
Nicholas et al.

[11] 3,778,261
[45] Dec. 11, 1973

[54] MANUFACTURING COMPOSITE ARTICLES

[75] Inventors: Michael George Nicholas, Wantage; Iain MacPahil, Reading, both of England

[73] Assignee: United Kingdom Atomic Energy Authority, London, England

[22] Filed: May 3, 1971

[21] Appl. No.: 139,837

[30] Foreign Application Priority Data
May 4, 1970   Great Britain ................ 21,460/70

[52] U.S. Cl. .................. 75/204, 75/200, 75/208 R
[51] Int. Cl. ........ C22c 29/00, B22f 1/00, B22f 3/00
[58] Field of Search .................... 75/204, 208 R, 200

[56] References Cited
UNITED STATES PATENTS

| | | | |
|---|---|---|---|
| 1,939,991 | 12/1933 | Krusell | 75/208 |
| 1,794,300 | 2/1931 | Kelly | 75/204 |
| 2,121,448 | 6/1938 | Ritzau | 75/208 |
| 1,944,758 | 1/1934 | Roux | 75/208 |
| 2,068,848 | 1/1937 | De Bats | 75/204 |
| 2,133,495 | 10/1938 | Willey | 75/204 |
| 2,134,305 | 10/1938 | Kieffer | 75/204 |
| 3,377,696 | 4/1968 | Parrow | 29/472.9 |

*Primary Examiner*—Carl D. Quarforth
*Assistant Examiner*—B. Hunt
*Attorney*—Larson, Taylor & Hinds

[57] ABSTRACT

A method of manufacturing a composite article comprises forming a metal matrix which includes a suitable carbide forming constituent contacting the matrix with a carbonaceous material to be incorporated in the matrix, and heating the matrix to a predetermined temperature below the melting point of the matrix for a sufficient length of time to induce the carbide forming constituent to diffuse through the matrix to the interface between the carbonaceous material and the matrix and react with the carbonaceous material to form a bonding carbide layer between the matrix and the carbonaceous material.

8 Claims, No Drawings

MANUFACTURING COMPOSITE ARTICLES

This invention relates to methods of manufacturing composite articles comprising a metallic matrix to which is bonded carbonaceous material, and articles so produced. The invention is particularly, although not exclusively concerned with composite articles which incorporate, or are coated or impregnated with, carbonaceous materials such as for example carbon fibres, diamond abrasives or refractory metal carbides.

An object of the present invention is to provide a solid state method of bonding carbonaceous material in a matrix material.

By "solid state" it is meant that the method of the present invention is carried out at temperatures below the melting point of the matrix material, i.e., whilst the matrix is a solid and is thus distinguished from prior art processes for bonding diamonds in metal matrices which rely on the "melting" ability of various materials and which are carried out at temperatures at which the matrix material is molten. The present invention is also distinguished over the prior art process which require the melting and fusing of a bronze material which is applied to the diamonds prior to contacting them with the matrix in which they are to be held.

According to the present invention a method of manufacturing a composite article comprises forming a metal matrix which includes a suitable carbide forming constituent as herein defined, contacting the matrix with a carbonaceous material to be incorporated in the matrix, and heating the matrix to a predetermined temperature below the melting point of the matrix for a sufficient length of time to induce the carbide forming constituent to diffuse through the matrix to the interface between the carbonaceous material and the matrix and react with the carbonaceous material to form a bonding carbide layer between the matrix and the carbonaceous material.

According to an aspect of the present invention a method of manufacturing a composite article comprises forming a metal matrix from a metal powder mixture which includes a suitable carbide forming constituent as herein defined, forming the mixture into a green artefact, curing the green artefact to produce a cured artefact, contacting the cured artefact with a carbonaceous material and heating the cured artefact to a predetermined temperature below the melting point of the matrix for a sufficient length of time to induce the carbide forming constituent of the matrix to diffuse through the matrix to the interface between the carbonaceous material and the matrix and react with the carbonaceous material to form a bonding carbide layer between the matrix and the carbonaceous material.

According to a further aspect of the present invention a method of manufacturing a composite article comprises forming a matrix from a powdered mixture which includes carbonaceous material and a sinterable carbide forming constituent, as herein defined forming the mixture into a green artefact, curing the green artefact, and heating to a predetermined temperature below the melting point of the cured artefact for a sufficient length of time to induce the carbide forming constituent of the matrix to diffuse through the matrix to the interface between the carbonaceous material and the matrix and react with the carbonaceous material to form a bonding carbide layer between the matrix and the carbonaceous material.

The carbonaceous material may be an abrasive material such as for example diamond particles or refractory metal carbides or may be in the form of carbon fibres.

Preferably the matrix may be formed from a copper based alloy, an aluminium based alloy, or a tin based alloy, and the suitable carbide forming constituents of the alloy may be, for example, one of the following metals: titanium, vanadium, chromium hafnium, manganese or iron.

By "suitable carbide forming constituent" it is meant one or more elements and/or an alloy of such elements which whist being compatible with the matrix material will react with the carbonaceous material at temperatures below the melting point of the matrix to form a carbide which is stable in the environment in which the final product is to be used. For example, if the final product is a diamond grinding wheel which will be used with a water based coolant then the carbide layer formed between the diamond and the matrix should not be soluble in water; in other words, the carbide bonding layer should not disintegrate during use of the product. In this respect $Al_4C_3$ $CaC_2$ and Scandium carbides have been found to be unsuitable for bonding diamonds to metal matrices when used with a water based coolant as they are soluble in water.

The term suitable carbide formers shall be taken to exclude carbide formers which will not react with the carbonaceous material to be incorporated in the matrix at temperatures below the melting point of the matrix and which will not diffuse through the matrix to the interface between the matrix and the carbonaceous material to form a bonding carbide layer.

According to yet a further aspect of the present invention there is provided an article manufactured in accordance with and one of the methods of manufacture of the present invention.

To enable the invention to be more readily understood the invention will now be described with reference to the following experiments.

In the first experiment a matrix was constructed from a copper based alloy which contained 1.0 percent by weight of chromium. A surface of the matrix so formed was contacted with diamond particles of about 7–15 microns particle size, the matrix was heated to 900° to 1,000°C for 16 hours in a vacuum at a pressure of $10^{-4}$ to $10^{-5}$ Torr and the diamonds were pressed into the matrix. Migration of the chromium content of the alloy to the interface between the matrix and the diamond particles formed an adherent bonding layer of carbide of a few microns thick.

To establish the rate of growth of the carbide bonding layer between the matrix and a carbonaceous material, various heat treatment were carried out on a number of different specimens of selected alloys. For example a number of matrices were formed from copper based alloys containing 1 percent by weight of Cr. Each matrix was contacted with vitreous carbon instead of diamond and heated to 950°C. This temperature was maintained for different lengths of time for different specimens. The specimens were sectioned and the thickness of the carbide layer between the vitreous carbon and the matrix measured. The following table (Table 1) shows some of the results obtained using a matrix of a non-ferrous copper alloy containing 1% Cr.

TABLE 1

| Time in days at 950°C | Thickness of carbide layer in $\mu$ m |
| --- | --- |

| | |
|---|---|
| 10 | 4.0 |
| 21 | 6.3 |
| 30 | 8.0 |
| 42 | 9.0 |

From the above experiments concerning the bonding of copper based alloys to vitreous carbon it is reasonable to expect that similar results may be obtained when using diamonds or carbon fibres instead of vitreous carbon providing the matrix is heated to a temperature below the melting point of the matrix for sufficient length of time to allow the carbide forming element in the matrix to diffuse through the matrix and react with the carbonaceous material.

As the present invention relies on the migration of a sinterable carbide former to form a carbide layer to bond the diamonds to the matrix, then if the size or number of diamond particles is altered it may be necessary to alter the amount of carbide former in the matrix. For example as the extent of the total surface area of diamond particles will increase by increasing the number or size of the diamonds so the amount of suitable carbide forming constituent may need to be increased to provide sufficient carbide former to migrate to the interface between the diamond and the matrix. A decrease in the size or number of diamond particles may necessitate a decrease in the amount of carbide formers in the matrix. Similarly by varying the rate of diffusion of the carbide former through the matrix the time for which the matrix is heated to permit the carbide to diffuse through the matrix a similar "adjustment" may be possible to take into account different sizes or numbers of diamonds.

The times at which the matrix is heated to induce diffusion of the carbide former through the matrix are important and are determined by such parameters as the interfacial area, the concentration of the carbide former in the matrix and the temperature of heat treatment. It is believed that the relationship between these parameters may be expressed by a modified Lifshitz-Wagner equation namely:

$$A = C \cdot (t/T) \, e^{-B/T}$$

where $A$ is a constant related to the critical thickness of carbide bonding layer, $C$ is the concentration of carbide former in the matrix $t$ is the time $T$ is the temperature $B$ is a constant It is our belief that the maximum useful concentration of suitable carbide forming element in the matrix will be approximately equal to its equilibrium solid solubility in the matrix metal.

When bonding diamonds into various matrices it is preferable to carry out the heat treatments in a neutral environment for example in argon (at a pressure of about $10^{-4}$ torr) or Co or $CO_2$. Oxidising atmospheres will degrade the diamond, and carburising atmospheres will compete with the diamond for the carbide forming constituent. Furthermore the best results are achieved at temperatures at which graphitisation of the diamond is minimal.

Furthermore if the carbonaceous material to be incorporated into the matrix is a refractory metal carbide, for example titanium carbide, or tungsten carbide or the like, then the carbide forming constituent of the matrix should be compatible with the matrix material and preferably be more reactive with the refractory metal carbide, than with the alloy forming the matrix. If such an alloy is heated to a temperature below its melting point for a sufficient length of time, migration of the carbide forming constituent in the matrix to the interface between the matrix and the refractory metal carbide occurs and a bonding carbide layer will be formed between the matrix and the refractory metal carbide.

It is to be understood that matrix may be made from metals which are non-reactive with carbonaceous materials, i.e., copper, lead and tin, and also metals such as aluminium which will react with carbonaceous material, but not strongly at temperatures below the melting point of the alloy, these metals are alloyed with one or more elements and are compatible with the matrix which will react readily with the carbonaceous material to effect bonding of the carbonaceous material to the matrix by the method of the present invention.

It has been found that because of similar characteristics, carbide forming metals other than titanium, vanadium and hafnium which also appear in the fourth period of the period table of elements are suitable carbide formers, e.g., scandium calcium, manganese and iron. Although scandium carbide and $Ca \, C_2$ are soluble in water and are not suitable for example, in bonding diamonds to grinding wheels which are to be used with water based coolants or in moist atmospheres.

A further material to which we have bonded diamond particles by a solid state process is stainless steel (i.e., an iron based alloy containing nickel and chromium).

The present invention may be used with advantage for incorporating carbon fibres in a metal matrix by distributing the carbon fibre throughout a powdered mixture of the matrix material either as a continuous tow or a chopped fibre and sintering the powdered mixture to produce a cured artefact containing the disperesed carbon fibres. The present invention greatly improves the bonding of the carbon fibres to the matrix material. By including in the powdered mixture a suitable carbide forming constituent that will react favourably with the carbon fibres to form an adherent bonding carbide layer a strong bonding carbide layer may be formed at the interface of the sintered matrix and the carbon fibre.

It is to be understood that the invention is not limited to the foregoing examples and if desired the carbide forming constituents may be implanted in the metal matrix by an ion implantation process or by a sputtering process.

We claim:

1. A solid state method of bonding a solid carbonaceous material selected from the group consisting of diamond, carbon fiber, and refractory metal carbides to a solid metal body which is principally of a metal which will not readily react with the carbonaceous material to form a carbide while the body is in the solid state comprising the steps of: incorporating in the body a metal carbide-forming constituent, said metal carbide forming constituent being dispersed within said body in a finely divided state; contacting the body with the carbonaceous material; heating the body to a temperature at which the body remains wholly solid and maintaining the body at the said temperature for a time sufficient to allow the metal carbide-forming constituent to diffuse through the body to the interface between the carbonaceous material and the body and to react in the solid state with the carbonaceous material to form a bonding carbide layer between the body and the carbonaceous material; the said metal carbide-forming constituent being one which will diffuse through the body and which will react in the solid state with the carbonaceous material to form a carbide, and the body being one which will allow the metal carbide-forming constituent to diffuse through it to the interface between the carbonaceous material and the body and to react with the carbonaceous material.

2. A method according to claim 1 wherein said solid carbonaceous material is tungsten carbide.

3. A method according to claim 1 wherein said solid carbonaceous material is titanium carbide.

4. A method according to claim 1 wherein said metal body is a copper-based alloy.

5. A method according to claim 1 wherein said metal body is an aluminum-based alloy.

6. A method according to claim 1 wherein said metal body is a tin-based alloy.

7. A method according to claim 1 wherein the metal carbide forming constituent is implanted into the metal body by an ion-implantation process.

8. A method according to claim 1 wherein the metal carbide forming constituent is implanted into the metal body by a sputtering process.

* * * * *